United States Patent [19]
Gastesi
::::

[11] Patent Number: 5,833,269
[45] Date of Patent: Nov. 10, 1998

[54] MODULAR MOTOR VEHICLE CHASSIS

[76] Inventor: Ignacio Gastesi, Rt. 1, Box 591Y, Scottsville, Va. 24590

[21] Appl. No.: 838,936

[22] Filed: Apr. 23, 1997

[51] Int. Cl.$^6$ .................................................. B62D 21/12
[52] U.S. Cl. ........................ 280/785; 280/798; 280/797; 296/196
[58] Field of Search .................................. 280/798, 797, 280/785, 788; 296/196, 194

[56] References Cited

U.S. PATENT DOCUMENTS

| 4,533,172 | 8/1985 | Oliver | 296/185 |
| 5,401,056 | 3/1995 | Eastman | 280/285 |

FOREIGN PATENT DOCUMENTS

| 278479 | 8/1988 | European Pat. Off. | 280/785 |

Primary Examiner—Christopher P. Ellis
Attorney, Agent, or Firm—Stephen Gates; Glenna Hendrick

[57] ABSTRACT

A modular chassis for a front engine-rear drive motor vehicle is described which comprises as structural components a front structural member comprising the engine and attachment points for front suspension members is attached rigidly and detachably to a middle structural member comprising a tube and the middle structural member is attached rigidly and detachably to a rear structural member comprising a transmission and attachment points for rear suspension members wherein the middle structural member is longitudinally disposed on the center line of the vehicle between the front structural member and the rear structural member and supports the majority of the torsional, lateral and longitudinal loads created between the front and rear structural members and the front and rear structural members support the torsional, lateral and longitudinal loads created between each and the middle structural member.

9 Claims, 4 Drawing Sheets

MODULAR MOTOR VEHICLE CHASSIS

BACKGROUND OF THE INVENTION (a) Field of the invention

This invention relates to a modular chassis useful for motor vehicles having a forward mounted engine, rear mounted transmission and rear wheel drive.

(b) Description of the Prior Art

For rear wheel drive motor vehicles such as race cars and sport cars, good traction is obtained by having about 60% of the total weight of the car supported by the rear axle of the vehicle. In the case of some front engine-rear drive vehicles known to the art this design goal has been achieved by locating the entire transmission on the rear axle and the engine, although in the front of the vehicle, is mounted to the rear of the front axle, with a transmission shaft from the engine to the transmission.

The typical chassis for a motor vehicle with the front engine-rear transmission-rear wheel drive arrangement is a separate structure, designed to support the torsional, lateral and vertical stresses generated between the front and rear suspension attachment points. The engine, transmission and other mechanical components of the vehicle are not part of such a chassis but instead are attached to it.

It is desirable for racing and sport cars to have the fuel tank placed on the center of gravity so that the changing fuel loads due to a full or empty tank do not alter the percentage weight distribution over the front and rear axles, causing the handling of the car to remain more constant as fuel is consumed. Typical chassis designs however usually do not provide sufficient space to place the fuel tank on the center of gravity of the vehicle. The typical chassis designs place the fuel tank near the rear axle and it is considered as ballast for the vehicle's weight distribution over the front and rear axles.

In general it is also desirable for the driver of a racing or sport car to have good road feedback and predictable car behavior. To achieve this, it is desirable that all the suspension components, the engine, and the transmission be rigidly attached to the chassis without any vibration dampers between them. This type of rigid attachment transmit vibrations to the passenger compartment however, which results in a hard, noisy ride. Conventional sport car designs therefore compromise between handling and comfort by installing vibration dampers of suitable rigidity between the chassis and the suspension components, the engine and the transmission.

SUMMARY OF THE INVENTION

It is an object of this invention to provide a light and simplified modular chassis construction for front engine-rear drive motor vehicles. The modular chassis comprises as structural components a front structural member attached rigidly and detachably to a tubular structural member which is attached rigidly and detachably to a rear structural member wherein the front structural member comprises a structural member providing attachment points for front suspension members and an engine and which supports the torsional, lateral and longitudinal loads created between the front suspension members and the tubular structural member;

the tubular structural member is longitudinally disposed on the center line of the vehicle between the front structural member and the rear structural member and supports the majority of the torsional, lateral and longitudinal loads created between the front and rear structural members; and the rear structural member comprises a structural member providing attachment points for rear suspension members and a transmission and supports the torsional, lateral and longitudinal loads created between the rear suspension members and the tubular structural member.

The tubular structural member is hollow in order to maximize its strength to weight ratio, thus helping to minimize the weight of the chassis. It may have any convenient cross section shape including, without limitation, round, oval, regular or irregular polygonal or the like. As will be shown beyond, the interior volume of the tubular structural member may also be used for additional purposes.

In a preferred embodiment the engine and the transmission are used as structural parts of the modular chassis. The complete modular chassis is formed from a front structural member which carries front suspension attachment points which is rigidly and detachably attached to an engine which is rigidly and detachably attached to a tubular structural member which is rigidly and detachably attached to a transmission which carries rear suspension attachment points. The engine supports the torsional, lateral and longitudinal loads created between the front member carrying the front suspension attachment points and the tubular structural member connecting the engine and the transmission. The tubular structural member supports the majority of the torsional, lateral and longitudinal loads created between the engine and the transmission. The transmission supports the torsional, lateral and longitudinal loads created between the tubular structural member and the rear suspension attachment points.

In another embodiment of the invention the fuel tank of the vehicle is located near the center of gravity of the vehicle by placing it inside the tubular structural member connecting the engine and the transmission.

In still another embodiment of the invention, in order to simplify construction as with race cars, the passenger compartment is attached directly to the tubular structural member without any vibration dampers. In this embodiment the passenger compartment may support a minor part of the torsional, lateral and longitudinal loads created between the front and rear structural members.

In still another embodiment of the invention when noise and vibration are important to the driver and any passengers, the passenger compartment is isolated from chassis vibrations by connecting it to the connecting tubular structure of the chassis with vibration damper means well understood in the art. The attachment points of the suspension as well as the engine and the transmission can be rigidly connected to the chassis for good road feed back and predictable car behavior without compromising comfort. Again in this embodiment, the passenger compartment may support a minor part of the torsional, lateral and longitudinal loads created between the front and rear structural members.

These and other objects achieved according to the present invention will be apparent from the following description and by making reference to the accompanying drawings.

PREFERRED EMBODIMENTS

The preferred embodiments of the present invention will now be explained with reference to the drawings.

Figure 1:
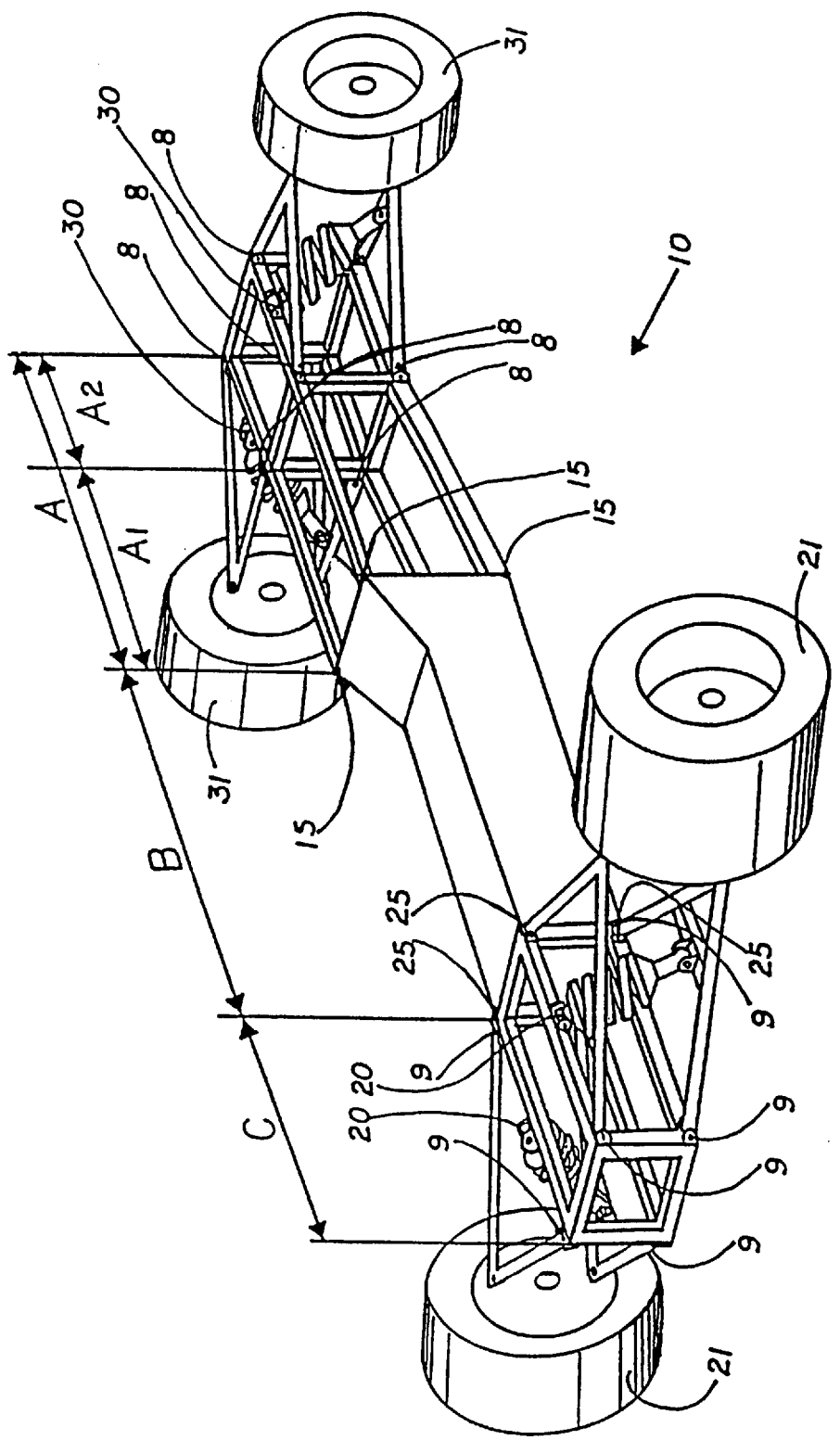
FIG. 1 is a schematic perspective view showing an assembled modular chassis of the invention.

FIG. 1. The modular chassis 10 comprises a front structural member A, which may be subdivided into an element A2 which provides front suspension attachment points 30 for vertical load support and 8 for lateral load support of the chassis 10 by the front wheels 31, and an element A1 which provides an engine (not shown) attached to the chassis 10; a rear structural member C which provides a transmission (not shown) and rear suspension attachment points 9 for lateral load support and 20 for vertical load support of the chassis 10 by the rear wheels 21; and a tubular structural member B which is rigidly and detachably connected at one end to the rear 15 of the front structural member A and rigidly and detachably connected at the other end to the front 25 of the rear structural member C, the tubular structural member thus functioning as a structural beam.

Figure 2:
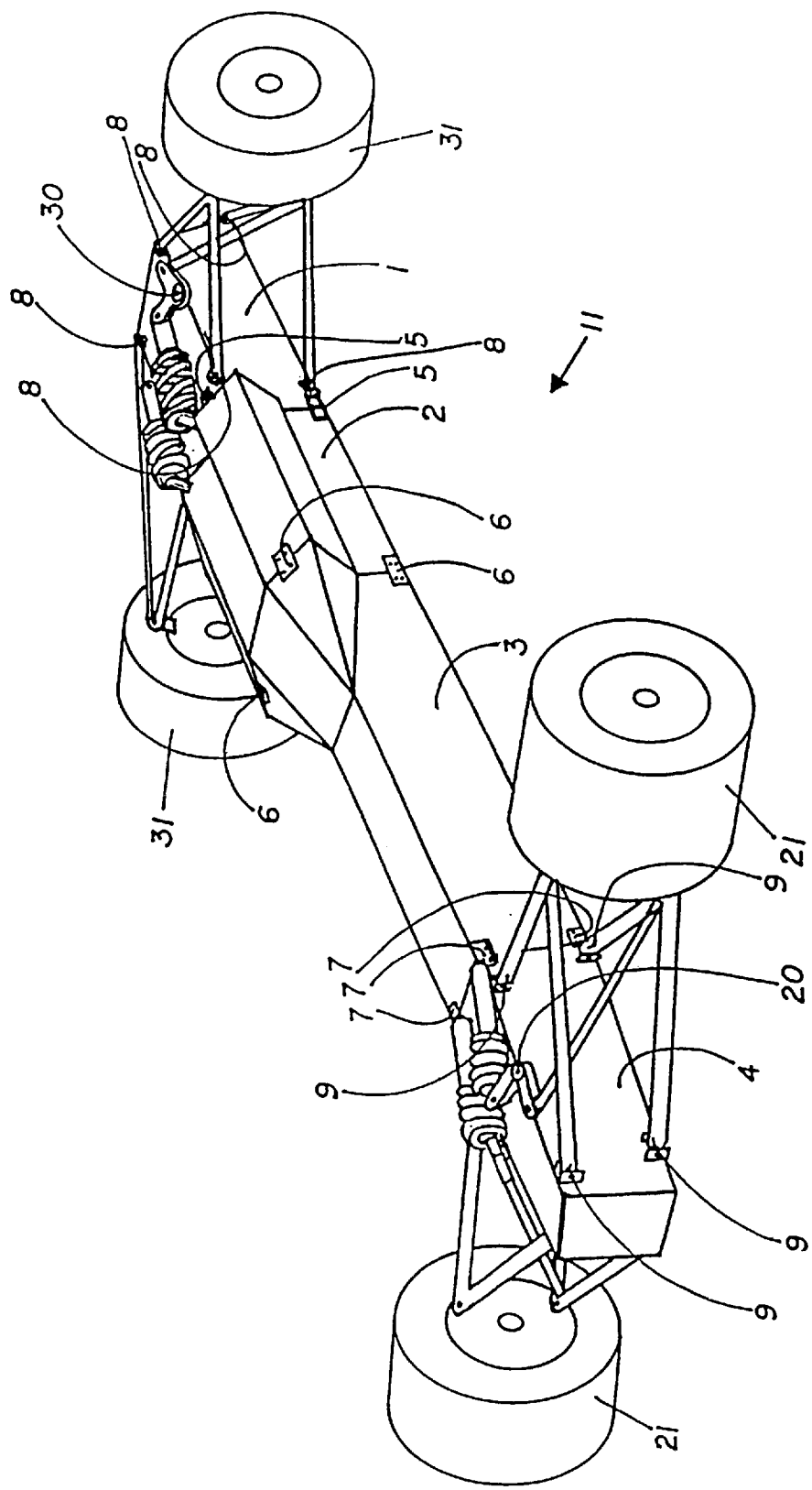
FIG. 2 is a schematic perspective view showing a preferred assembled modular chassis of the invention.

FIG. 2 illustrates a preferred embodiment of the invention in which the modular chassis 11 comprises a front structural member 1 having front suspension attachment points 30 for vertical load support and 8 for lateral load support of the chassis 11 by the front wheels 31, rigidly and detachably connected to the front 5 of the engine 2. An engine useful as a structural component of the chassis 11 of this embodiment of the present invention must be designed taking this into account. The requirements for designing the body of an engine to have the strength needed to act as a structural member are well understood by those skilled in the art. Tubular structural member 3 is connected to the rear 6 of the engine 2 and is also rigidly connected to the front 7 of the transmission 4, thus functioning as a structural beam. The connecting structure 3 between the engine 2 and the transmission 4 may have any convenient cross section shape including, without limitation, round, oval, regular or irregular polygonal or the like. The requirements for designing the connecting member 3 to have the strength needed to act as a structural member are well understood by those skilled in the art. Transmission 4 carries rear suspension attachment points 9 for lateral load support and 20 for vertical load support of the chassis 11 by the rear wheels 21. Again the requirements for designing the transmission to have the strength needed to act as a structural member of the chassis are well understood by those skilled in the art.

Figure 3:
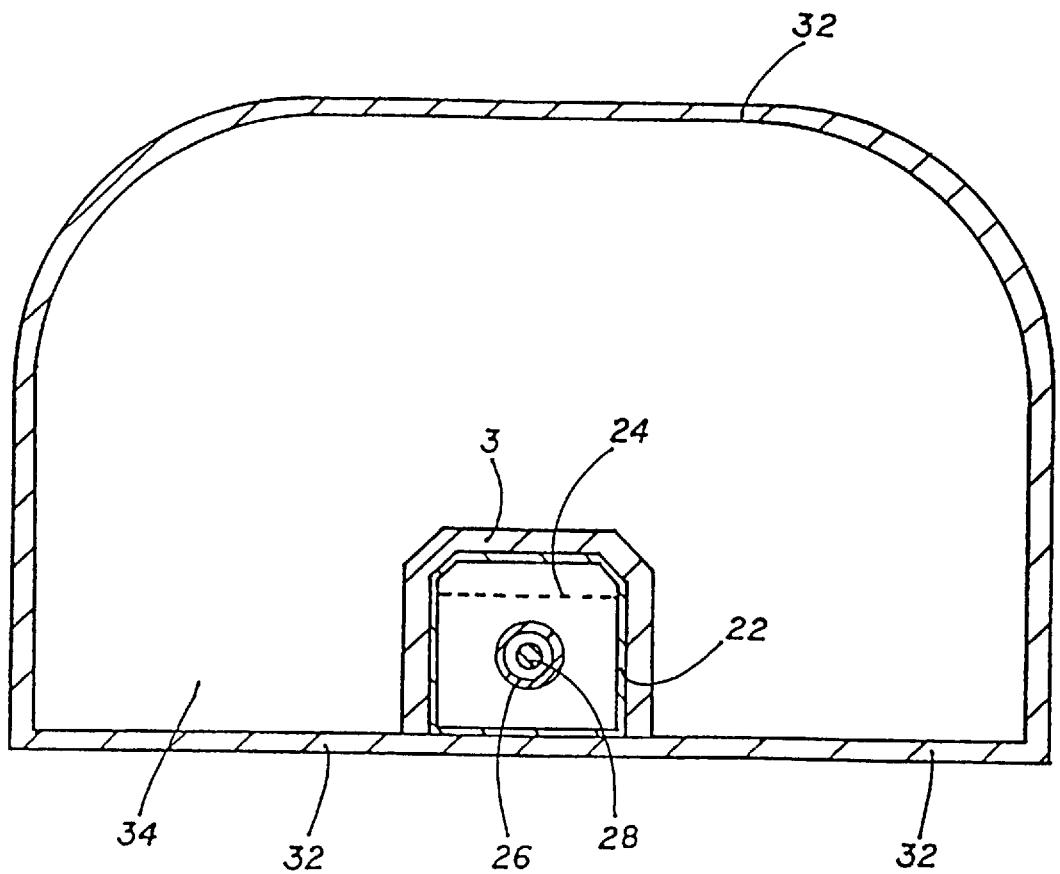
FIG. 3 is a schematic view of another embodiment of the invention showing in cross section a passenger compartment attached to the structural tubular member of the invention and showing an optional fuel tank placed in the interior of the structural tubular member with a hollow coaxial chamber inside of the fuel tank for passage of the transmission shaft.

FIG. 3. represents an embodiment of the invention in which the body of the vehicle 32, represented in cross section, is rigidly attached to the tubular structural member 3. Number 34 indicates the interior volume of the passenger compartment 32. In this embodiment the passenger compartment 32 is not isolated from the vibrations of the tubular structural member 3. In this embodiment the passenger compartment may support a minor part of the torsional, lateral and longitudinal loads created between the front and rear structural members. An optional fuel tank 22 is shown in cross section inside of the tubular structural member 3. A typical fuel level 24 is shown inside the fuel tank 22. In this embodiment the fuel tank 22 may have a hollow passage 26 coaxial to its longitudinal dimension allowing the transmission shaft 28, represented in cross section, passing through it.

Figure 4:
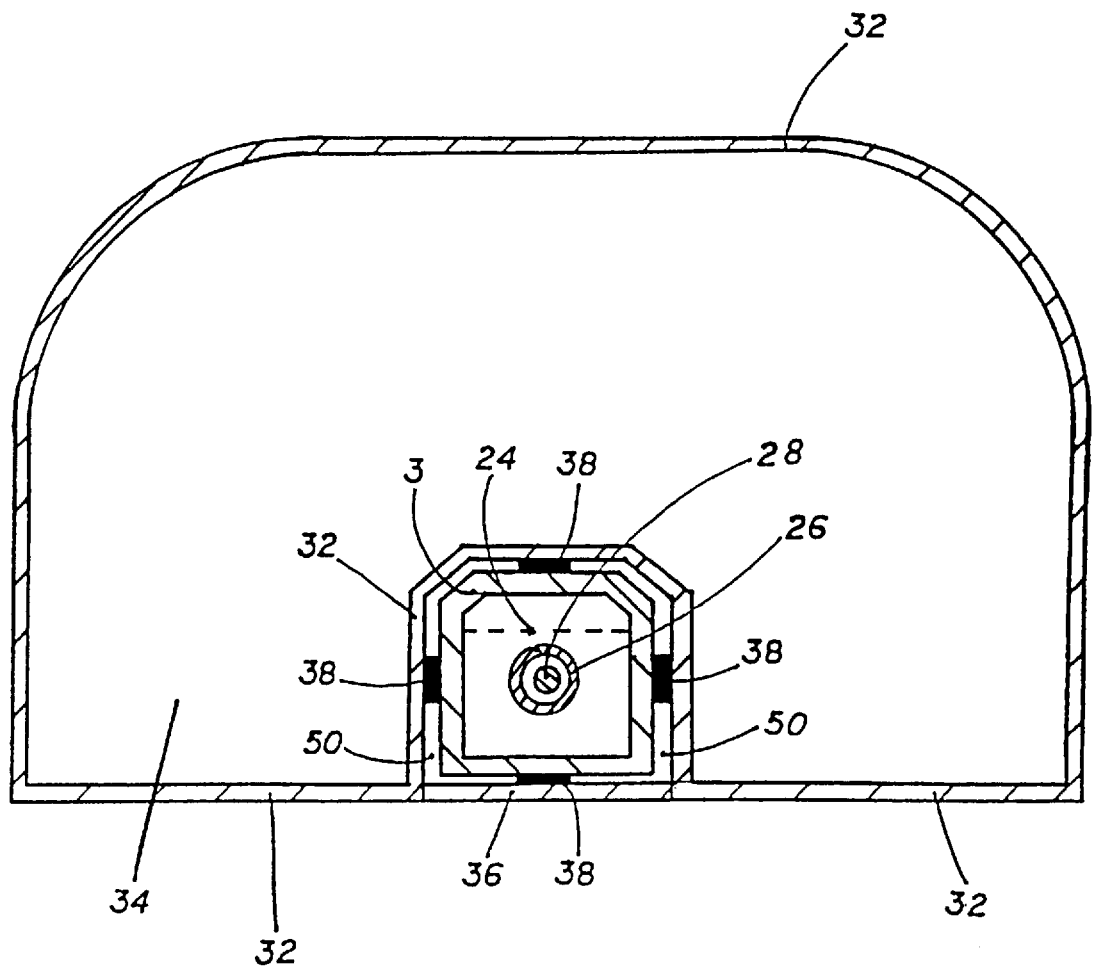
FIG. 4 is a schematic view of another embodiment of the invention showing in cross section a passenger compartment attached to the tubular structural member of the invention with gap and vibration dampers between them and showing an optional fuel tank placed in the interior of the tubular structural member with a hollow coaxial chamber inside of the fuel tank for passage of the transmission shaft.

FIG. 4 represents another embodiment of the invention. The body of the vehicle 32, represented in cross section is isolated from vibrations from the tubular structural member 3 shown in cross section. Number 34 indicates the interior volume of the passenger compartment 32. Vibration absorbing means 38 placed on the tubular structural member 3, support the entire passenger compartment 32 and create a gap 50 between the body of the vehicle 32 and the tubular structural member 3. For ease in assembly and disassembly of the body 32 from the tubular structural member number 3, a bottom plate 36 may be detachable from the rest of the body 32. Again in this embodiment the passenger compartment may support a minor part of the torsional, lateral and longitudinal loads created between the front and rear structural members. An optional fuel tank 22 is shown in cross section inside of the tubular structural member 3. A typical fuel level 24 is shown inside the fuel tank 22. In this embodiment the fuel tank 22 may have a hollow passage 26 coaxial to its longitudinal dimension allowing the transmission shaft 28, represented in cross section, passing through it.

The design requirements for means for forming rigid, detachable connections between the elements of the modular chassis of the invention are well understood by those skilled in the art. Such means include, without limitation, means such as screws or nuts and bolts connecting a flange or the like on one component to a flange or other mating surface on the other.

It should be understood that means such as struts, braces, frames and the like may be employed to provide minor additional structural support to the tubular structural member of the invention or other component(s) used as structural elements of the chassis without departing from the invention so long as the elements so supported member itself provides the majority of structural resistance to torsional, lateral and vertical stress placed upon the supported member.

What is claimed is:

1. A modular chassis for a front engine-rear drive motor vehicle comprising as structural components a front structural member attached rigidly and detachably to a middle structural member comprising a tube, said middle structural member being attached rigidly and detachably to a rear structural member wherein the front structural member comprises a structural member providing attachment points for front suspension members and an engine and supports the torsional, lateral and longitudinal loads created between the front suspension members and the middle structural member;

the middle structural member is longitudinally disposed on the center line of the vehicle between the front structural member and the rear structural member and supports the majority of the torsional, lateral and longitudinal loads created between the front and rear structural members; and the rear structural member comprises a structural member providing attachment points for rear suspension members and a transmission and supports the torsional, lateral and longitudinal loads created between the rear suspension members and the middle structural member.

2. A modular chassis for a front engine-rear drive motor vehicle comprising as structural components a front structural member attached rigidly and detachably to a middle structural member comprising a tube, said middle structural member being attached rigidly and detachably to a rear structural member wherein the front structural member comprises the engine and provides attachment points for front suspension members and supports the torsional, lateral and longitudinal loads created between the front suspension members and the middle structural member;

the middle structural member is longitudinally disposed on the center line of the vehicle between the front structural member and the rear structural member and supports the majority of the torsional, lateral and longitudinal loads created between the front and rear structural members; and the rear structural member comprises a transmission providing attachment points for rear suspension members and supports the torsional, lateral and longitudinal loads created between the rear suspension members and the middle structural provides the rear suspension attachment points.

3. A chassis according to claim 2 wherein a fuel tank is placed in the interior of the tubular structural member.

4. A front engine-rear drive motor vehicle having a chassis according to claim 2 wherein a passenger compartment is attached to the tubular structural member with vibration damping means.

5. A front engine and rear driven motor vehicle having a chassis according to claim 2 wherein a passenger compartment is rigidly attached to the tubular structural member.

6. A modular chassis for a front engine-rear drive motor vehicle comprising as structural components;

a front structural member providing attachment points for front suspension members, rigidly and detachably attached to an engine positioned to the rear of the front structural member, a transmission which provides attachment points for rear suspension members, and a middle structural member comprising a tube longitudinally disposed on the center line of the vehicle between the engine and the transmission and rigidly and detachably attached at one end to the engine and rigidly and detachably attached at the other end to the transmission wherein each component is able to support the torsional, lateral and longitudinal loads created between the front and rear suspension attachment points.

7. A chassis according to claim 6 wherein a fuel tank is placed in the interior of the tubular structural member.

8. A front engine and rear drive motor vehicle having a chassis according to claim 6 wherein a passenger compartment is attached to the tubular structural member with vibration damping means.

9. A front engine and rear driven motor vehicle having a chassis according to claim 6 wherein a passenger compartment is rigidly attached to the tubular structural member.

* * * * *